(12) United States Patent
Hakaste et al.

(10) Patent No.: US 6,377,817 B1
(45) Date of Patent: Apr. 23, 2002

(54) ASYMMETRIC DATA TRANSMISSION FOR USE IN A MULTI-MODULATION ENVIRONMENT

(75) Inventors: Markus Hakaste, Helsinki; Shkumbin Hamiti, Espoo; Harri Jokinen, Hiisi; Eero Nikula, Espoo, all of (FI)

(73) Assignee: Nokia Mobile Phones Ltd. (FI)

( * ) Notice: Subject to any disclaimer, the term of this patent is extended or adjusted under 35 U.S.C. 154(b) by 0 days.

(21) Appl. No.: 09/551,012

(22) Filed: Apr. 18, 2000

Related U.S. Application Data

(60) Provisional application No. 60/132,196, filed on May 3, 1999.

(51) Int. Cl.$^7$ ................................................ H04B 1/38
(52) U.S. Cl. ....................... 455/553; 455/102; 370/252
(58) Field of Search ............................... 455/553, 403, 455/466, 108, 102, 188.1, 182.1, 173.1, 51, 136, 139; 370/252, 319–321, 324, 430, 503; 375/219, 268–270, 271

(56) References Cited

U.S. PATENT DOCUMENTS

| | | | | |
|---|---|---|---|---|
| 5,448,623 A | * | 9/1995 | Wiedeman et al. ............ 379/59 |
| 5,537,672 A | * | 7/1996 | Grabow et al. ............. 455/132 |
| 5,602,868 A | * | 2/1997 | Wilson ....................... 375/219 |
| 5,673,291 A | | 9/1997 | Dent ........................... 375/262 |
| 5,845,215 A | * | 12/1998 | Henry et al. ................. 455/553 |
| 5,845,985 A | * | 12/1998 | Sainton et al. .............. 455/553 |
| 5,943,344 A | | 8/1999 | Keller et al. ................. 370/468 |
| 5,960,354 A | | 9/1999 | Einola ......................... 455/454 |
| 5,963,548 A | * | 10/1999 | Virtanen ..................... 370/335 |
| 5,995,829 A | * | 11/1999 | Broderick ................... 455/418 |
| 6,005,857 A | | 12/1999 | Honkasalo et al. ......... 370/337 |
| 6,006,105 A | * | 12/1999 | Rostoker et al. ............ 455/552 |
| 6,035,212 A | | 3/2000 | Rostoker et al. ............ 455/552 |
| 6,052,408 A | | 4/2000 | Trompower et al. ........ 375/206 |
| 6,061,549 A | * | 5/2000 | Labonte et al. ............ 455/67.3 |
| 6,069,537 A | * | 5/2000 | Kim et al. ................... 332/119 |
| 6,088,430 A | | 7/2000 | McHale .................... 379/93.28 |

* cited by examiner

*Primary Examiner*—Nay Maung
*Assistant Examiner*—Charles Craver
(74) *Attorney, Agent, or Firm*—Harrington & Smith, LLP

(57) ABSTRACT

A data transmission method and system for circuit switched and other services that can be employed in TDMA-based systems, and that supports the use of one or several types of modulation (e.g., 8-PSK modulation), in addition to a "normal" modulation (e.g., GMSK modulation) on a radio interface. An additional modulation/channel coding (e.g., one based on 8-PSK) may be used in the downlink transmission, while the normal modulation/channel coding (e.g., one based on GMSK) may be used in the uplink transmissions, under a variety of different conditions. A first condition arises where the radio conditions allow the use of the additional modulation in both directions, but the mobile station transmitter does not support it. A second condition arises where the radio conditions allow the use of the additional modulation in both directions, and the mobile station supports it, but the user requests a downlink-biased or uplink-biased data transmission service. A third condition arises where the mobile station supports the use of the additional modulation in both directions, but the uplink (or downlink) radio conditions do not permit the use of the additional modulation (e.g., because of link budget limitations.) Also, a lower data rate may be desired on the uplink in order to reduce the power consumption of the mobile station, and/or in the downlink direction to avoid unnecessary interference. This is especially true in the case that one direction or the other has less data to transmit, and the high speed data transmission mode is not required (even if supported).

38 Claims, 2 Drawing Sheets

US 6,377,817 B1

ASYMMETRIC DATA TRANSMISSION FOR USE IN A MULTI-MODULATION ENVIRONMENT

CLAIM OF PRIORITY FROM A COPENDING PROVISIONAL PATENT APPLICATION

Priority is herewith claimed under 35 U.S.C. §119(e) from copending Provisional Patent Application No. 60/132,196, filed 05/03/99, entitled "Asymmetric Data Transmission in Multi-Modulation Environment", by Markus Hakaste et al. The disclosure of this Provisional Patent Application is incorporated by reference herein in its entirety.

FIELD OF THE INVENTION

This invention relates generally to radiotelephones and, in particular, to radiotelephones or mobile stations capable of operation with a digital wireless telecommunications network.

BACKGROUND OF THE INVENTION

One modern wireless telecommunications system is known as the Global System for Mobile Communication (GSM) Evolution (EDGE), which includes Enhanced Circuit Switched Data (ECSD) and Enhanced Global Packet Radio Service (EGPRS). The teachings of this invention are particularly relevant to the ECSD aspect, as well as to other types of TDMA systems, such as the IS-136 system in the United States, having circuit switched services.

During the EDGE standardization process some mobile equipment or mobile station manufacturers expressed a concern that they were not able to immediately support 8-PSK modulation in their transmitters. The 8-PSK modulation was selected for GSM, in addition to the Gaussian Minimum Shift Keying (GMSK) type of modulation that was already in use. Some manufacturers also expressed an interest in providing low cost mobile equipment that would not support 8-PSK transmissions.

As may be appreciated, these limitations make it very difficult to support high bit rate circuit switched services with 8-PSK modulation, without changing the manner in which these services are defined in the GSM specification.

Currently, the GSM specification defines circuit switched services as "symmetric" services, that is, using the same modulation/channel coding in both the uplink direction (mobile station (MS) to base transceiver station (BTS)) and in the downlink direction (BTS to MS). Furthermore, there were no proposals as to how to support ECSD services for those "simple" mobile stations that were unable to transmit with 8-PSK modulation in the uplink direction.

One problem that results from this situation, in the case of circuit switched GSM or some other "symmetrical" systems, is in enabling the use of different types of modulation on the same radio interface, wherein the "simple" mobile stations cannot make full use of the system capabilities without having a complex transmitter that supports all system modulation schemes. This is due largely to the current symmetrical nature of the radio interface, where the same modulation/channel coding is used for both MS reception (downlink) and MS transmission (uplink).

Another problem that results in the case of the above-mentioned system(s) is that if a downlink biased data transfer is required by the MS, for example the transfer of a large file on the downlink, with a "more complex" MS that supports several of the system modulation schemes, the MS must, according to current GSM specifications, use the downlink modulation/channel coding also for uplink transmission. However, this type of transmission is not optimal from the MS power consumption and/or uplink robustness point of view. That is, and if one assumes a sufficient amount of BTS transmitter power, the ECSD link can be maintained for a longer distance if GMSK modulation is used in the uplink, as opposed 8-PSK modulation. This is particularly true when the MS operates with limited transmitter power classes. It should be noted in this regard that even if the MS output power is equal for 8-PSK and GMSK, the link budget is inferior for the 8-PSK modulation case.

OBJECTS AND ADVANTAGES OF THE INVENTION

It is a first object and advantage of this invention to provide a technique for accommodating mobile stations with varying modulation capabilities in a wireless telecommunications system.

It is a second object and advantage of this invention to provide wireless communications system with an ability to selectively provide symmetrical or asymmetrical data services in the downlink or the uplink, and to further enable different types of modulation and bit rates to be used in the downlink and the uplink.

SUMMARY OF THE INVENTION

The foregoing and other problems are overcome and the objects of the invention are realized by methods and apparatus in accordance with embodiments of this invention.

The teachings of this invention provide a data transmission method and system (e.g., GSM EDGE) for circuit switched and other services that is employed, preferably, in TDMA-based systems, and that supports the use of one or several types of modulation (e.g., 8-PSK modulation), in addition to a "normal" modulation (e.g., GMSK modulation) on the radio interface. An additional modulation/channel coding (e.g., one based on 8-PSK) may be used in the downlink transmission, while the normal modulation/channel coding (e.g., one based on GMSK) may be used in the uplink transmissions, under a variety of different conditions.

A first condition arises where the radio conditions allow the use of the additional modulation in both directions, but the mobile station transmitter does not support the additional modulation. For example, the mobile station may be capable of receiving 8-PSK downlink transmissions, but is only capable of GMSK modulated uplink transmissions.

A second condition arises where the radio conditions allow the use of the additional modulation in both directions, and the mobile station supports the additional modulation, but the user requests a downlink-biased (or an uplink-biased) data transmission service.

A third condition arises where the mobile station supports the use of the additional modulation in both directions, but the uplink (or the downlink) radio conditions do not permit the use of the additional modulation (e.g., because of link budget limitations.)

Under all of the foregoing conditions, the same Layer-3 (L3) protocol format is used in both directions for transferring the data frames (e.g., 14.5 kbps Radio Link Protocol (RLP)).

Under the second condition, the mobile station automatically uses the normal modulation in the uplink according to the user's request, and the base station uses a blind detection of the uplink bursts to identify the type of modulation used for the uplink transmissions.

Also under the second condition, the mobile station indicates during call setup signaling that the downlink biased service is requested by the user, and the network establishes the connection accordingly.

Under the third condition, if the link budget is not sufficient for 8-PSK modulation (or some other type of additional modulation), the network may command a power control level that is not supported by the mobile station for the additional modulation. In this case the mobile station will, preferably, use a nearest supported output power control level.

The teachings of this invention enable the use of different data rates for the uplink and the downlink, thus providing improved radio resource utilization, a simpler ECSD mobile station implementation and, assuming a reduced power consumption for the ECSD mobile station, an extended range of the cell for ECSD services. Further in this regard, and as was indicated above, even if the mobile station output power is equal for both the 8-PSK and GMSK modulation cases, the link budget is generally inferior for 8-PSK.

Also, a lower data rate may be desired on the uplink in order to reduce the power consumption of the mobile station, and/or in the downlink direction to avoid unnecessary interference. This is especially true in the case that one direction or the other has less data to transmit, and the high speed data transmission mode is not required (even if supported).

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

It should be realized at the outset that, while the invention will be described below in the context of a TDMA-type system (e.g., GSM or enhanced GSM), certain aspects of the teachings of this invention can be extended to other types of systems, such as CDMA systems. Furthermore, the teachings of this invention are not limited for use with only circuit-switched embodiments, but have wider applicability. For example, the teachings of this invention can be extended to packet radio services as well. In general, any system that is capable of using different modulation types may benefit from the use of the teachings found herein, although the gain may be less significant in a system that employs linear modulation as a "basic" modulation type, i.e., that employs a basic modulation type that provides the best range properties.

Figure 4:
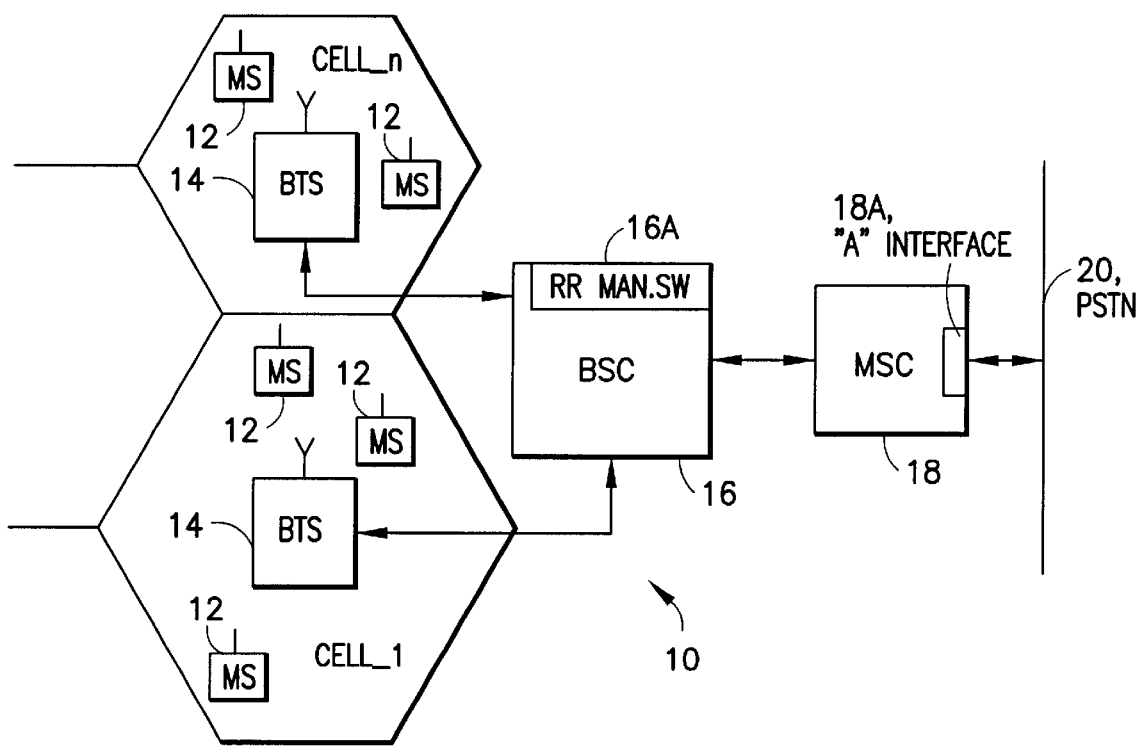
FIG. 4 is a simplified block diagram of a wireless digital telecommunications system that is suitable for practicing this invention.

FIG. 4 is a simplified block diagram of a cellular telecommunications system 10 in accordance with a presently preferred embodiment of this invention. The system 10 is assumed for the purposes of this description to be a GSM system or a GSM-type system. However, the teachings of this invention are not limited for use in only GSM or GSM-type systems.

A plurality of mobile stations (MS) 12 are located within cells (Cell_1, . . . , Cell_n) each of which is associated with a base transceiver station (BTS) 14. The various BTS 14 are coupled to a base station controller (BSC) 16, which in turn is coupled to a mobile switching center (MSC) 18. The MSC 18 provides connections through an "A" interface 18A to external telephone and data networks, such as the public switched telephone network (PSTN) 20, as well as to packet data networks, etc. In other embodiments each BTS 14 may have its own BSC 16. The BSC 16 includes a Radio Resource Management software module or function 16A, or some equivalent thereto, which is employed for managing the radio links in the various cells.

While this invention will be described below in the context of GSM EDGE, this is but one example of where and how the teachings of this invention can be applied.

It is first noted that current signaling mechanisms for GSM and High Speed Circuit Switched Data (HSCSD, defined in GSM 03.34) do not provide support for the case where different channel codings are used for the uplink and the downlink. In order to provide a reduced complexity solution it is desirable to employ the current signaling mechanisms to the greatest extent possible. The signaling for the support of asymmetric cases in ECSD can be accomplished in various ways. In general, there are two presently preferred solutions (explicit signalling and implicit signalling), both of which can be exploited in accordance with the teachings of this invention.

Explicit Signalling

A first approach is referred to as explicit signaling, wherein several new parameters are added to the existing signalling information elements. The following is a general description of the signalling changes in accordance with one preferred embodiment.

Classmark

In one embodiment the mobile station 12 indicates in a Classmark_ Change message its full or partial support for EDGE. More specifically, the mobile station 12 indicates one of two possibilities for using additional modulation (e.g., 8-PSK) in addition to the normal modulation (e.g., GMSK):

1. The additional modulation is supported for uplink transmission and downlink reception
2. The additional modulation is supported for downlink reception only.

Call Control

In order to indicate the preference for asymmetric service by the mobile station 12, at least two bits are provided in a field of a Bearer Capability Information Element. The Setup message is one type of message capable of carrying this Information Element. One exemplary use of codepoints in this Information Element is as follows:

| Bit | 1 | 2 | |
|---|---|---|---|
| | 1 | 0 | Downlink biased channel coding asymmetry is preferred |
| | 0 | 1 | Uplink biased channel coding asymmetry is preferred |
| | 0 | 0 | Channel coding symmetry preferred |
| | 1 | 1 | Unused, if received this bit combination is interpreted as "Channel coding symmetry preferred" |

In addition to the foregoing, there may be additional codepoints in other signalling messages, such as the WAIUR (Wanted Air Interface User Rate), that can be employed for this purpose.

Also, the user of the mobile station 12 or the wireless network may choose to switch to an asymmetric service during a call that was initiated as a symmetric call, or vice versa. This can be accomplished by using, for example, a Modify procedure that includes the Bearer Capability Information Element, as modified above.

Radio Resource

Figure 1:
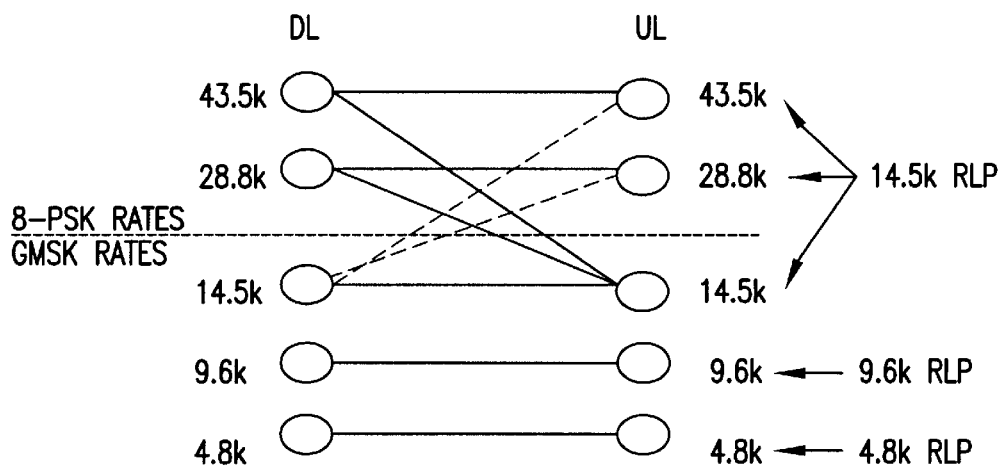
FIG. 1 depicts various possible uplink (UL) and downlink (DL) data rate combinations, expressed in thousands of bits per second (kbps)
Figure 2:
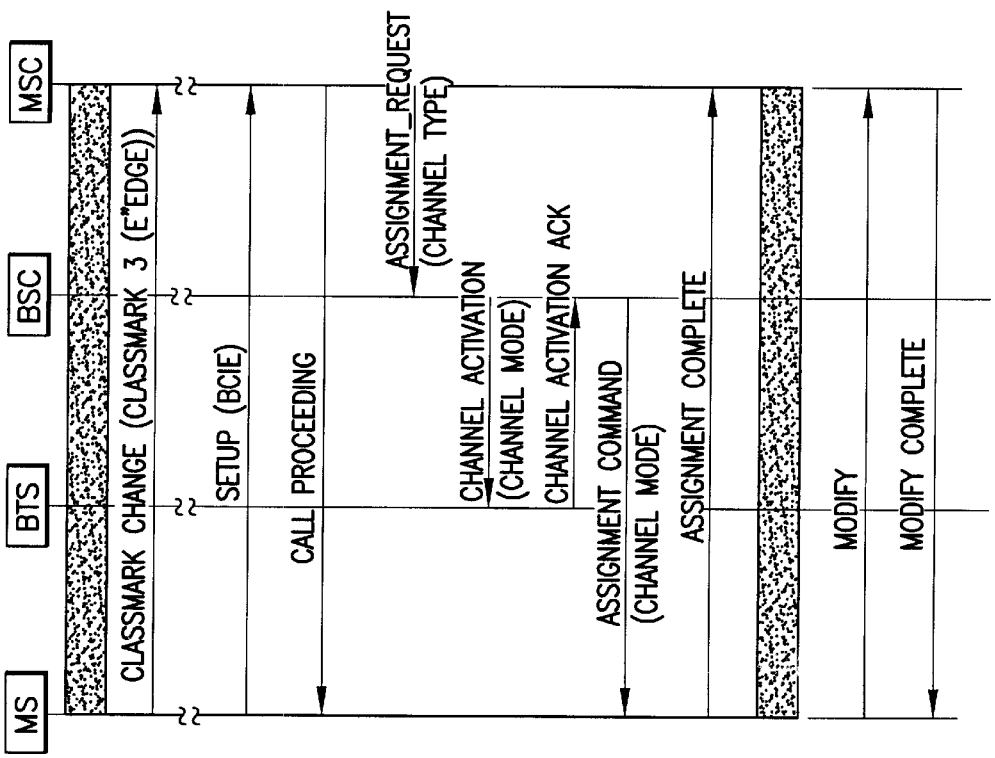
FIG. 2 is an example of signalling between the mobile station (MS), base transceiver station (BTS), base station controller (BSC) and mobile switching center (MSC) for an (explicit) asymmetry case.

In GSM the BSC 16 is responsible for the radio resource management (RR Management software module 16A), and makes use of different signaling messages for handling the radio resources. An example depicted in FIG. 2 shows the use of a Channel Activation message during a mobile originated (MO) call. In order to support the asymmetric service there is a need for a definition of new channel modes. Referring to FIG. 1, one embodiment defines the channel modes as follows (UL+DL)

For the Downlink (DL) biased mode of operation:
    Assym_mode 1: 14.5+43.5
    Assym_mode 2: 14.5+28.8
    Assym_mode 3: 28.8+43.5
For the Uplink (UL) biased mode of operation
    Assym_mode 4: 43.5+14.5
    Assym_mode 5: 28.8+14.5
    Assym_mode 6: 43.5+28.8

A Interface

The information that the MSC 18 obtains from the mobile station 12 via the Classmark_Change message is used during the assignment procedure in order to support asymmetric services. This embodiment thus requires changes to the Information Elements in the messages on the A interface 18A. One example is shown in FIG. 2 for an Assignment Request message.

Implicit Signalling

Turning now to the case where the mobile station 12 does support 8-PSK modulation in the uplink, it is preferred that the wireless network rely on the blind detection of the modulation by the BTS 14, which then informs, if necessary, the BSC 16 of the channel mode used on the air interface. This is considered to be implicit signalling, as the modulation type is determined (detected) directly from the mobile station transmissions, without requiring explicit signalling.

The blind detection or identification of the uplink modulation can be based on the different phase rotation characteristics of the 8-PSK modulation and the GMSK modulation. More specifically, in GMSK a continuous $\pi/2$ rotation is defined, while in 8-PSK a continuous $3\pi/8$ rotation is defined (see, for example, GSM 05.02 and 05.04). Based on these differences, the uplink modulation can be reliably identified in the BTS 14 receiver, without prior knowledge (i.e., no additional signaling is required) about the modulation used in the transmitter of the mobile station 12.

Figure 3:
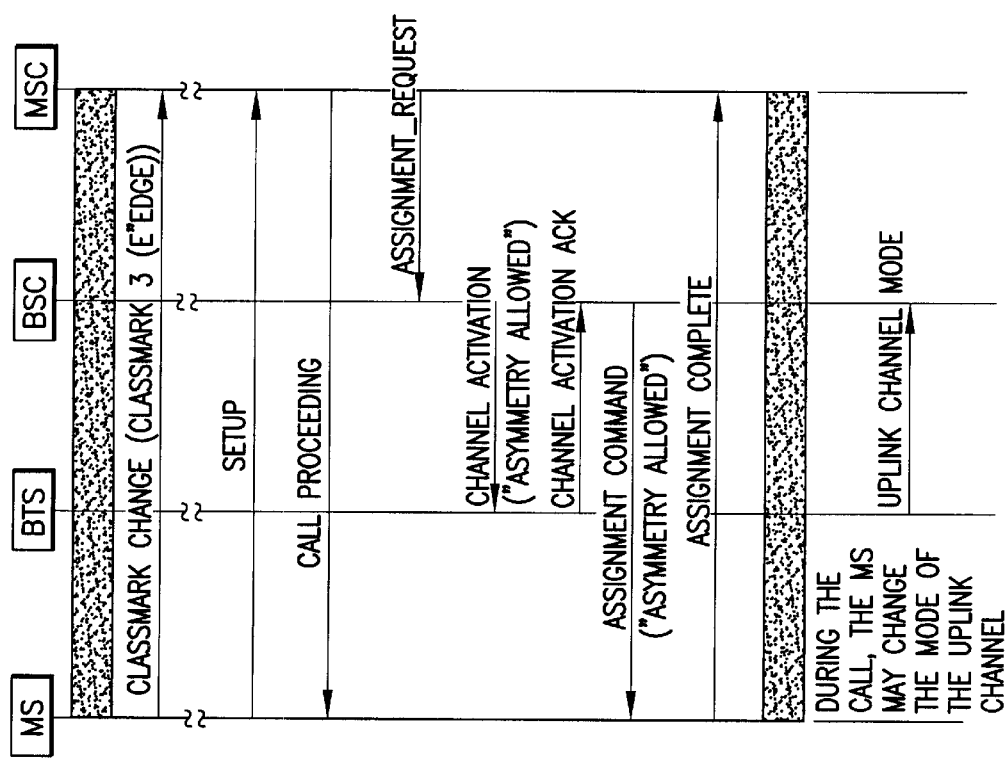
FIG. 3 is an example of signalling between the MS, BTS, BSC and MSC for an (implicit) asymmetry case.

An example of the embodiment wherein the mobile station 12 does support 8-PSK in the uplink is shown in the implicit signalling case of FIG. 3. In this example, the mobile station 12 uses the Classmark_Change Information Element to inform the network of its modulation capabilities. The network is then aware that the mobile station 12 is 8-PSK capable for both the uplink and the downlink. If the network decides to allow the use of asymmetry then the BSC 16 employs the Channel Activation and Assignment Command messages (in this example) to allow the asymmetry. In this case the mobile station 12 transmits on the uplink at any rate allowed. For example, and referring again to FIG. 1, if the downlink data rate is 43.5 kbps, then the MS can transmit on the uplink either at 14.5 kbps or 43.5 kbps.

Various reasons for changing the mode of the channel uplink could based on (a) the link adaptation algorithm in the mobile station 12, (b) if the link budget is not sufficient for using the additional modulation (e.g., 8-PSK) in the uplink, or (c) if the application does not require a high bit rate transmission capability in the uplink.

For the case where the downlink link budget does not support the second modulation, various reasons for changing the mode of the channel downlink could based on (a) the link adaptation algorithm, (b) if the link budget is not sufficient for using the additional modulation (e.g., 8PSK) in the downlink, or (c) if the application does not require a high bit rate transmission capability in the downlink.

The signaling for the asymmetric case can be the same as for the symmetric case, with the exception that the Classmark 3 Information Element (IE) can be used for deriving the appropriate asymmetric mode.

It is preferred that the mobile station 12 uses an algorithm that prevents frequent changes of the uplink mode during a call. Every time the uplink mode changes, the BTS 14 may inform the BSC 16 of the change. An example of this is shown in FIG. 3, where an Uplink Channel Mode message is used for the purpose of informing the BSC 16 of the change in the channel mode uplink. Alternatively, an Information Element in one of the messages from the BTS 14 to the BSC 16, such as a Measurement Results message, can be used for signalling the change in the uplink mode of the mobile station 12. It is noted that are cases when the BSC 16 is or should be aware of the changes in the uplink mode, such as is the case when power control is used for extended range operation.

Also, it should be appreciated that a lower data rate may be desired on the uplink in order to reduce the power consumption of the mobile station 12, and/or in the downlink direction to avoid unnecessary interference. This is especially true in the case that one direction or the other has less data to transmit, and the high speed data transmission mode is not required (even if supported). As was stated above, while the invention has been described in the context of a TDMA-type system (e.g., GSM), it should be appreciated that aspects of this invention may be extended to other types of systems such as, but not limited to, CDMA systems. Furthermore, the teachings of this invention are not limited for use with only circuit-switched embodiments, but have wider applicability.

Also, and under the third condition discussed previously, it is within the scope of this invention for the mobile station 12 to automatically start transmission with the normal modulation (e.g., GMSK), and the BTS 14 may optionally be informed by the BSC 16 of this mode of operation so that blind detection of the uplink modulation type is not required by the BTS 14. That is, while it may be presently preferred that the mobile station 12 not change its mode without being commanded through explicit signalling, and thus not perform link adaptation, it is within the scope of these teachings to provide a capability for the mobile station 12 to operate in this manner.

Thus, while the invention has been particularly shown and described with respect to preferred embodiments thereof, it will be understood by those skilled in the art that changes in form and details may be made therein without departing from the scope and spirit of the invention.

What is claimed is:

1. A method for supporting data transmission services in a digital wireless communication system that operates with a first type of modulation between a mobile station and a wireless network, comprising steps of:

bidirectionally coupling a mobile station to the network through a radio interface; and in a first case, applying a second, different type of modulation in a downlink direction from the network to the mobile station unless at least one of a plurality of conditions are found to apply, while in a second case, applying a second, different type of modulation in an uplink direction from the mobile station to the network unless one of the plurality of conditions are found to apply, wherein one of said conditions is that the second type of modulation is supported in the network, but is not supported in both directions by the mobile station.

2. A method as in claim 1, wherein another one of said conditions is that a user specifically requests a downlink biased data link service, which is also used by the mobile station in the uplink, and wherein the modulation type is implicitly detected by the network from received uplink mobile station transmissions.

3. A method as in claim 1, wherein another one of said conditions is that a user specifically requests an uplink biased data link service, which is also used by the mobile station in the downlink, and wherein the modulation type is implicitly detected by the network from received uplink mobile station transmissions.

4. A method as in claim 1, wherein another one of said conditions is that the mobile station supports the second type of modulation, but uplink conditions restrict the use of the second type of modulation, while another one of said conditions is that the mobile station supports the second type of modulation, but downlink conditions restrict the use of the second type of modulation.

5. A method as in claim 1, wherein an uplink data rate is caused to differ from a downlink data rate in order to at least one of reduce a power consumption of the mobile station, or to reduce an amount of interference in the downlink direction.

6. A method as in claim 1, wherein for any of the plurality of conditions the same L3 protocol is applied for data transmission in both the downlink and the uplink.

7. A method as in claim 1, wherein one of the modulation types is 8-PSK modulation, wherein another of the modulation types is GMSK modulation, and wherein the uplink and the downlink operate with the same or with different data rates.

8. A method as in claim 1, wherein the mobile station indicates to the network in a message that the second type of modulation is supported for both uplink transmission and downlink reception, or that the second type of modulation is supported for downlink reception only.

9. A method as in claim 8, wherein the message is Classmark_Change message.

10. A method as in claim 1, wherein the mobile station explicitly indicates to the network one of the following: that downlink biased channel coding asymmetry is preferred, that uplink biased channel coding asymmetry is preferred, or that channel coding symmetry preferred.

11. A method as in claim 10, wherein the mobile station explicitly indicates to the network in a message having a Bearer Capability Information Element.

12. A method as in claim 1, wherein the mobile station explicitly indicates to the network one of two conditions for using an additional type of modulation, in addition to a normal type of modulation: (a) the additional type of modulation is supported for uplink transmission and downlink reception; or (b) the additional type of modulation is supported for downlink reception only.

13. A method as in claim 12, wherein the mobile station explicitly indicates to the network the one of the two conditions in a Classmark_Change message.

14. A method as in claim 1, wherein the mobile station explicitly indicates to the network a preference for asymmetric service using a first bit and a second bit in an Information Element.

15. A method as in claim 14, wherein the Information Element is a Bearer Capability Information Element.

16. A method as in claim 14, wherein the Information Element is a Bearer Capability Information Element in a Setup message.

17. A method as in claim 14, wherein the Information Element is sent in a WAIUR (Wanted Air Interface User Rate) message.

18. A method as in claim 1, wherein the mobile station explicitly indicates to the network a preference for one of asymmetric service or symmetric service using a first bit and a second bit in an Information Element as follows:

| Bit | 1 | 2 | |
|---|---|---|---|
| | 1 | 0 | downlink biased channel coding asymmetry is preferred, |
| | 0 | 1 | uplink biased channel coding asymmetry is preferred, and |
| | 0 | 0 | channel coding symmetry preferred. |

19. A method as in claim 18, wherein if both the first and the second bits are set, the network interprets the Information Element as specifying that channel coding symmetry preferred.

20. A method as in claim 1, and comprising a further step of switching to an asymmetric service during a call that was initiated as a symmetric call.

21. A method as in claim 20, wherein the mobile station explicitly indicates to the network a preference for switching to the asymmetric service using a first bit and a second bit in an Information Element as follows:

| Bit | 1 | 2 | |
|---|---|---|---|
| | 1 | 0 | downlink biased channel coding asymmetry is preferred, and |
| | 0 | 1 | uplink biased channel coding asymmetry is preferred. |

22. A method as in claim 21, wherein the Information Element is a Bearer Capability Information Element.

23. A method as in claim 1, and comprising a further step of switching to a symmetric service during a call that was initiated as an asymmetric call.

24. A method as in claim 23, wherein the mobile station explicitly indicates to the network a preference for switching to the symmetric service using a first bit and a second bit in an Information Element.

25. A method as in claim 24, wherein the Information Element is a Bearer Capability Information Element.

26. A digital wireless communication system that supports digital data communications and that operates with a first type of modulation between a mobile station and a wireless network, comprising:

a wireless interface for bidirectionally coupling the mobile station to the network; and control circuitry operable (a) in a first case for applying a second, different type of modulation in a downlink direction from the network to the mobile station unless at least one of a plurality of conditions are found to apply, while (b) in a second case, applying a second, different type of modulation in an uplink direction from the mobile station to the network unless one of the plurality of conditions are found to apply, wherein one of said conditions is that the second type of modulation is supported in the network, but is not supported in both directions by the mobile station.

27. A system as in claim 26, wherein another one of said conditions is that a user specifically requests one of a downlink biased data link service or an uplink biased data link service, which is also used by the mobile station in the uplink or the downlink, respectively, and at least the modulation type of which is detected by the network from received uplink mobile station transmissions, and wherein another one of said conditions is that the mobile station supports the second type of modulation, but either uplink or downlink conditions restrict the use of the second type of modulation.

28. A method as in claim 26, wherein for any of the plurality of conditions the same L3 protocol is applied for data transmission in both the downlink and the uplink.

29. A system as in claim 26, wherein one of the modulation types is 8-PSK modulation, and wherein another of the modulation types is GMSK modulation.

30. A system as in claim 26, wherein the mobile station explicitly indicates to the network in a Information Element that the second type of modulation is supported for both uplink transmission and downlink reception, or that the second type of modulation is supported for downlink reception only, and further explicitly indicates to the network that downlink biased channel coding asymmetry is preferred, or that uplink biased channel coding asymmetry is preferred, or that channel coding symmetry preferred.

31. A system as in claim 26, wherein said control circuitry switches to an asymmetric service during a call that was initiated as a symmetric call, or switches to a symmetric service during a call that was initiated as an asymmetric call.

32. A method for supporting data transmission services in a digital wireless communication system, comprising steps of:

bidirectionally coupling a mobile station to the network through a radio interface; and explicitly signaling to the network a preference for one of asymmetric service or symmetric service using predetermined bits in an Information Element, wherein the mobile station explicitly signals to the network one of two conditions for using a different type of modulation than a normal type of modulation: (a) the additional type of modulation is supported for uplink transmission and downlink reception; or (b) the additional type of modulation is supported for downlink reception only.

33. A method as in claim 32, wherein the Information Element is a Bearer Capability Information Element.

34. A method as in claim 32, wherein the Information Element is a Bearer Capability Information Element in a Setup message.

35. A method as in claim 32, wherein the mobile station explicitly signals to the network a preference for asymmetric service or symmetric service using a first bit and a second bit in an Information Element as follows:

| Bit | 1 | 2 | |
|-----|---|---|---|
|     | 1 | 0 | downlink biased channel coding asymmetry is preferred, |
|     | 0 | 1 | uplink biased channel coding asymmetry is preferred, and |
|     | 0 | 0 | channel coding symmetry preferred. |

36. A method as in claim 35, wherein if both the first and the second bits are set, the network interprets the Information Element as specifying that channel coding symmetry preferred.

37. A method as in claim 32, wherein implicit signalling is used to cause an uplink data rate to differ from a downlink data rate in order to at least one of reduce power consumption of the mobile station, or to reduce an amount of interference in the downlink direction.

38. A method as in claim 32, wherein implicit signalling is based on range considerations.

* * * * *